Figure 1:
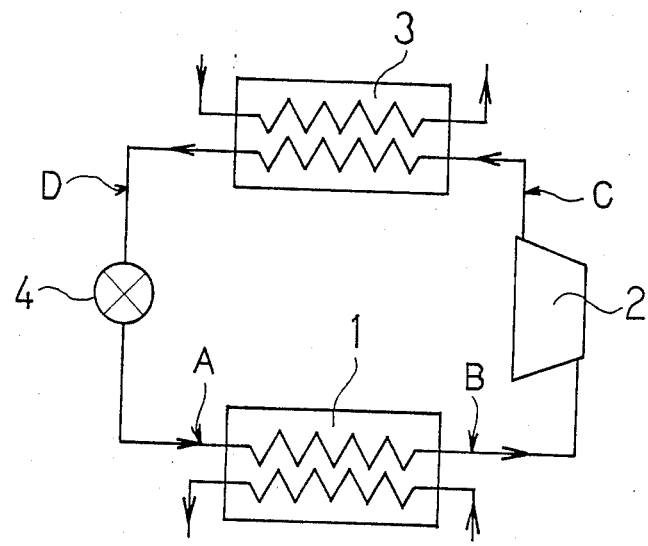

United States Patent [19]

Enjo et al.

[11] Patent Number: 4,673,517

[45] Date of Patent: Jun. 16, 1987

[54] HEAT PUMP

[75] Inventors: Naonori Enjo, Suita; Masahiro Noguchi, Osaka; Satoshi Ide, Settsu, all of Japan

[73] Assignee: Daikin Kogyo Co., Ltd., Osaka, Japan

[21] Appl. No.: 803,525

[22] Filed: Dec. 2, 1985

Related U.S. Application Data

[63] Continuation of Ser. No. 617,471, Jun. 5, 1984, abandoned.

[30] Foreign Application Priority Data

Jun. 6, 1983 [JP] Japan ................. 58-101372

[51] Int. Cl.$^4$ .............................. C09K 5/04
[52] U.S. Cl. ................... 252/67; 62/324.1; 568/842
[58] Field of Search .......... 252/67; 568/842; 62/324.1

[56] References Cited

U.S. PATENT DOCUMENTS 3,415,894 12/1968 Yale ........................... 568/842
4,232,525 11/1980 Enjo et al. ..................... 252/67
4,455,247 6/1984 Nakayama et al. ............ 568/842

OTHER PUBLICATIONS

Kolesov et al., "Standard Enthalpies of Formation of Some Fluoropropanols", Dokl. Akad. Nauk SSSR, 1969, 184(4), 857–9, CA 70: 91397u.

Rochester et al., "Thermodynamic Studies of Fluoro Alcohols, 3, Thermodynamics of Transfer of Five Fluoro Alcohols From the Gas Phase to Aqueous Solution", J. Chem. Soc., Faraday Trans. 1, 1973, 69(9), 1577–85, CA 79: 145768x.

Primary Examiner—Robert A. Wax
Attorney, Agent, or Firm—Larson and Taylor

[57] ABSTRACT

A heat pump medium comprising 2,2,3,3,3-pentafluoropropanol either alone or in admixture with water.

4 Claims, 2 Drawing Figures

HEAT PUMP

This application is a continuation of application Ser. No. 617,471 filed June 5, 1984, now abandoned.

This invention relates to a heat pump and, more particularly, to working fluids for compression type heat pumps which utilize heat sources at 50°–100° C. to thereby produce high temperatures of 100°–200° C.

Heretofore, water has been substantially the only practical working fluid in heat pumps in which heat energy conversion from a low-temperature low-grade level to a high-temperature high-grade level is effected by repeating a cycle comprising bringing a liquid working fluid into contact with a low-temperature heat source to thereby heat and evaporate said medium, compressing the working fluid by a compressor, then condensing the working fluid in a heat exchanger to thereby raise the temperature of another medium which comes into contact with said working fluid in said heat exchanger, and bringing said working fluid (now in the liquid form), through a throttle valve, again into contact with the low-temperature heat source.

However, the freezing point and boiling point of water are high and the water vapor density is small, so that the range of use of water is limited. In particular, when a low-temperature heat source is to be utilized, water, which is small in heat capacity, is disadvantageous in that a capacious apparatus is required and that the efficiency is low.

The art has so far proposed to use various organic compounds as working fluids for a heat pump to thereby eliminate the above drawbacks that water has. However, most of such organic compounds are unsatisfactory in heat stability or are corrosive. At present, there is no satisfactory working fluid available.

Accordingly, it is an object of the invention to provide heat pump working fluid which are high in heat capacity, satisfactory in heat stability and, furthermore, very low in corrosivity.

The above object can be accomplished by using 2,2,3,3,3-pentafluoropropanol or a mixture of the same and water as a working fluid for a heat pump water being used in an amount of 0–10% by weight, preferably 4–8% by weight and more preferably about 6% by weight. Said working fluid which no more has the above drawbacks, has bery good characteristic properties which are requisite for its use as a heat pump working fluid.

The working fluid for a heat pump according to the invention, which comprises 2,2,3,3,3-pentafluoropropanol (hereinafter abbreviated as 5FP) or a mixture of 5FP and water has the following characteristic properties:

(1) It has a higher capacity of heating heat pumps as compared with water;

(2) 5FP retains a high level of stability even in high temperature regions and mixtures of 5FP and water also have similar high-level stability. Such stability is one of the important requirements which heat pump working fluid should meet.

Now, referring to the accompanying drawing, the present invention will be described in more detail.

Figure 2:
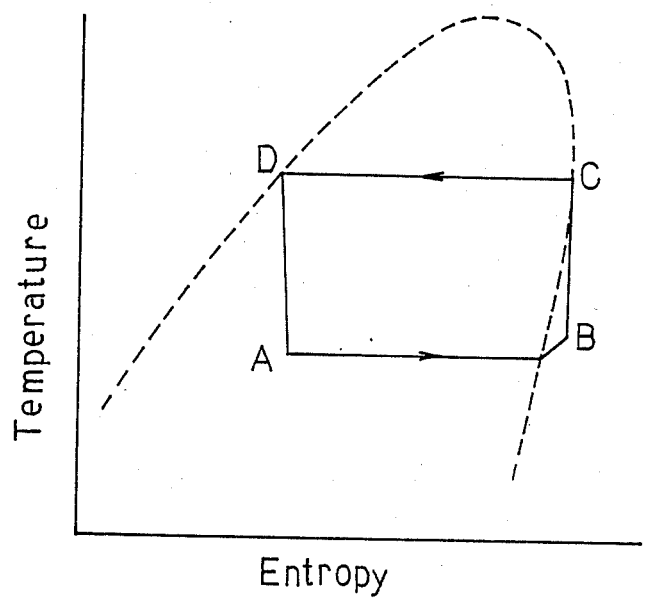

FIG. 1 is a system diagram illustrating a heat pump for converting low-grade heat energy to high-grade heat energy, and FIG. 2 is a diagrammatic representation, as a temperature-entropy diagram, of a heat pump cycle in which 5FP is used as the working fluid. The alphabetic symbols (A to D) appearing in FIG. 1 respectively correspond to those (A to D) in FIG. 2 and represent points of state of the working fluid.

Referring to FIG. 1, a working fluid is heated in a vaporizer (1) by a low temperature heat source. Corresponding to the change of state from A to B as shown in FIG. 2, the working fluid boils and the whole amount of it vaporizes. The medium in the vapor state is superheated to a slight extent and enters a compressor (2) where the working fluid is adiabatically compressed to give a high-temperature vapor (as indicated by the change of state from B to C in FIG. 2). The high-temperature high-pressure vapor then enters a condenser (3) where it gives the high-temperature heat of condensation to a fluid to be heated, whereby said working fluid is condensed and turns to a liquid (change of state from C to D in FIG. 2). The liquefied working fluid undergoes adiabatic throttle expansion in a throttle valve (4), whereby the working fluid is partly evaporated and reaches a low-temperature low-pressure state (change of state from D to A in FIG. 2) and again enters the evaporator. In this manner, the above-mentioned cycle is repeated. The above heat pump cycle can convert heat energy from a low grade level to a high grade level.

The following examples and comparative examples further illustrate the invention.

EXAMPLES 1–10 and COMPARATIVE EXAMPLES 1–5

The heat pump cycle illustrated in FIG. 1 and FIG. 2 was carried out using 5FP or a mixture of 5FP and water (weivght ratio: 5FP/water=94:6) in accordance with the invention or using water for comparison in one and the same apparatus. As for the operation conditions, the evaporation temperature (point A in FIG. 2) was selected within the wide range of 50°–100° C. and the condensation temperature (point C) correspondingly within the range of 100°–180° C. The characteristics, inclusive of the heat capacity per unit volume of the working fluid and the coefficient of performance (heating capacity/compression work), were determined. The results obtained are given in Tables 1–5.

The results shown in Tables 1–5 indicate that although slightly inferior in coefficient of performance, 5FP is much superior in heating capacity to water and that this tendency is more remarkable at lower heat source temperature levels. Admixture of water with 5FP results in a much increased heat capacity and at the same time in an improved coefficient of performance. The most favorable characteristics are obtained when the amount of water admixed with 5FP is 6% by weight. Whereas the heat capacity can be much improved at water addition levels other than 6% by weight, phase separation occurs between 5FP and water at water addition levels exceeding 10% by weight. Therefore, water is desirably admixed in an amount of 0–10% by weight. While the use of water causes excessive superheating in the compression process, leading to a great loss in heat transfer, the use of 5FP is advantageous in that the superheating remains at a low level and accordingly the condenser size can be reduced.

TABLE 1

Evaporation temperature 50° C.
Condensation temperature 100° C.

| Medium | | Comparative Example 1 Water | Example 1 5FP/water 94/6 | Example 2 5FP |
|---|---|---|---|---|
| Evaporation pressure | Kg/cm² abs | 0.126 | 0.340 | 0.258 |
| Condensation pressure | Kg/cm² abs | 1.03 | 2.27 | 2.12 |
| Compression ratio | — | 8.20 | 6.68 | 8.22 |
| Compressor inlet gas density | Kg/m³ | 0.083 | 1.31 | 1.41 |
| Compression work | Kcal/Kg | 95.6 | 12.2 | 9.6 |
| Heat capacity per m³ of medium | Kcal/m³ | 51.0 | 106.4 | 82.0 |
| Coefficient of performance | — | 6.43 | 6.68 | 6.09 |
| Superheating degree | °C. | 162 | 3 | 5 |
| Heating capacity ratio | — | 1 | 2.09 | 1.61 |
| Performance coefficient ratio | — | 1 | 1.04 | 0.95 |

TABLE 2

Evaporation temperature 80° C.
Condensation temperature 120° C.

| Medium | | Comparative Example 2 Water | Example 3 5FP/water 94/6 | Example 4 5FP |
|---|---|---|---|---|
| Evaporation pressure | Kg/cm² abs | 0.483 | 1.14 | 1.01 |
| Condensation pressure | Kg/cm² abs | 2.03 | 4.18 | 4.00 |
| Compression ratio | — | 4.19 | 3.65 | 3.96 |
| Compressor inlet gas density | Kg/m³ | 0.293 | 4.11 | 5.10 |
| Compression work | Kcal/Kg | 64.9 | 8.8 | 6.2 |
| Heat capacity per m³ of medium | Kcal/m³ | 168.8 | 315.1 | 266.5 |
| Coefficient of performance | — | 8.88 | 8.76 | 8.38 |
| Superheating degree | °C. | 102 | 0 | 8 |
| Heating capacity ratio | — | 1 | 1.87 | 1.58 |
| Performance coefficient ratio | — | 1 | 0.99 | 0.94 |

TABLE 3

Evaporation temperature 80° C.
Condensation temperature 150° C.

| Medium | | Comparative Example 3 Water | Example 5 5FP/water 94/6 | Example 6 5FP |
|---|---|---|---|---|
| Evaporation pressure | Kg/cm² abs | 0.483 | 1.14 | 1.01 |
| Condensation pressure | Kg/cm² abs | 4.85 | 9.26 | 8.81 |
| Compression ratio | — | 10.1 | 8.10 | 8.73 |
| Compressor inlet gas density | Kg/m³ | 0.293 | 4.10 | 5.00 |
| Compression work | Kcal/Kg | 102.1 | 14.4 | 10.2 |
| Heat capacity per m³ of medium | Kcal/m³ | 175.9 | 282.1 | 213.2 |
| Coefficient of performance | — | 5.00 | 4.79 | 4.17 |
| Superheating degree | °C. | 190 | 2 | 15 |
| Heating capacity ratio | — | 1 | 1.60 | 1.21 |
| Performance coefficient ratio | — | 1 | 0.96 | 0.83 |

TABLE 4

Evaporation temperature 100° C.
Condensation temperature 150° C.

| Medium | | Comparative Example 4 Water | Example 7 5FP/water 94/6 | Example 8 5FP |
|---|---|---|---|---|
| Evaporation pressure | Kg/cm² abs | 1.03 | 2.27 | 2.12 |
| Condensation pressure | Kg/cm² abs | 4.85 | 9.26 | 8.81 |
| Compression ratio | — | 4.70 | 4.08 | 4.16 |
| Compressor inlet gas density | Kg/m³ | 0.598 | 7.9 | 10.4 |
| Compression work | Kcal/Kg | 76.3 | 9.5 | 6.6 |
| Heat capacity per m³ of medium | Kcal/m³ | 337.5 | 543.5 | 443.4 |
| Coefficient of performance | — | 7.40 | 7.27 | 6.44 |
| Superheating degree | °C. | 116 | 2 | 12 |
| Heating capacity ratio | — | 1 | 1.61 | 1.31 |
| Performance coefficient ratio | — | 1 | 0.98 | 0.87 |

TABLE 5

| Medium | | Comparative Example 5 Water | Example 9 5FP/water 94/6 | Example 10 5FP |
|---|---|---|---|---|
| Evaporation temperature 100° C. Condensation temperature 180° C. | | | | |
| Evaporation pressure | Kg/cm² abs | 1.03 | 2.27 | 2.12 |
| Condensation pressure | Kg/cm² abs | 10.22 | 18.27 | 16.80 |
| Compression ratio | — | 9.90 | 8.04 | 7.92 |
| Compressor inlet gas density | Kg/m³ | 0.598 | 7.9 | 10.4 |
| Compression work | Kcal/Kg | 121.9 | 14.0 | 9.6 |
| Heating capacity per m³ of medium | Kcal/m³ | 346.1 | 452.8 | 332.9 |
| Coefficient of performance | — | 4.75 | 4.09 | 3.34 |
| Superheating degree | °C. | 183 | 3 | 17 |
| Heating capacity ratio | — | 1 | 1.31 | 0.96 |
| Performance coefficient ratio | — | 1 | 0.86 | 0.70 |

The working fluid 5FP or a mixture of 5FP and water (5FP/water weight ratio=94/6) was placed in a glass tube together with iron and a lubricant oil. The tube was sealed and the contents were heated at 250° C. for 100 hours. Thereafter, the fluoride ion concentration in the working fluid in the sealed tube was determined using an ion meter and the decomposition products were quantitatively determined by gas chromatography. The results obtained are given in Table 6.

TABLE 6

| Medium | Fluoride ion concentration after heating (ppm) | Decomposition products after heating (weight %) |
|---|---|---|
| 5FP | 16 | 0.13 |
| 5FP/water (94/6) | 23 | 0.18 |

As shown in Table 6, the fluoride ion formation from the working fluids according to the invention, namely 5FP and the mixture of 5FP and water, at high temperatures is slight and the decomposition product formation detectable by gas chromatographic analysis is also slight. That the fluoride ion formation at high temperatures is slight means that the working fluids are little corrosive to metallic materials of apparatus. That the decomposition product formation is slight means that changes in the thermodynamic characteristics of the heat pump working fluids or efficiency fall, which otherwise would result from increased decomposition product formation during use, hardly occurs.

As described hereinabove, the working fluid for a heat pump according to the invention which comprises 5FP or a mixture of 5FP and water is superior in characteristic properties to water in conventional use and also is superior to known organic media in heating characteristics, thermal stability and corrosivity.

What is claimed is:

1. In a heat pump comprising a working fluid used for converting a low-grade heat energy to high-grade heat energy, the improvement wherein said working fluid comprises 2,2,3,3,3-pentafluoropropanol or an admixture thereof with up to 10% by weight of water.

2. A heat pump according to claim 1 wherein said working fluid comprises an admixture of 92–96% by weight 2,2,3,3,3-pentafluoropropanol and 4 to 8% by weight water.

3. A heat pump according to claim 2 wherein said admixture comprises about 94% by weight of 2,2,3,3,3-pentafluoropropanol and about 6% by weight of water.

4. A heat pump according to claim 1 wherein said working fluid is essentially free of water.

* * * * *